Aug. 3, 1943.　　　C. E. KERR　　　2,325,859
CORN HUSKER
Filed July 22, 1940　　　3 Sheets-Sheet 1

Inventor
CHARLES E. KERR
By Philip A. Minnis
Attorney

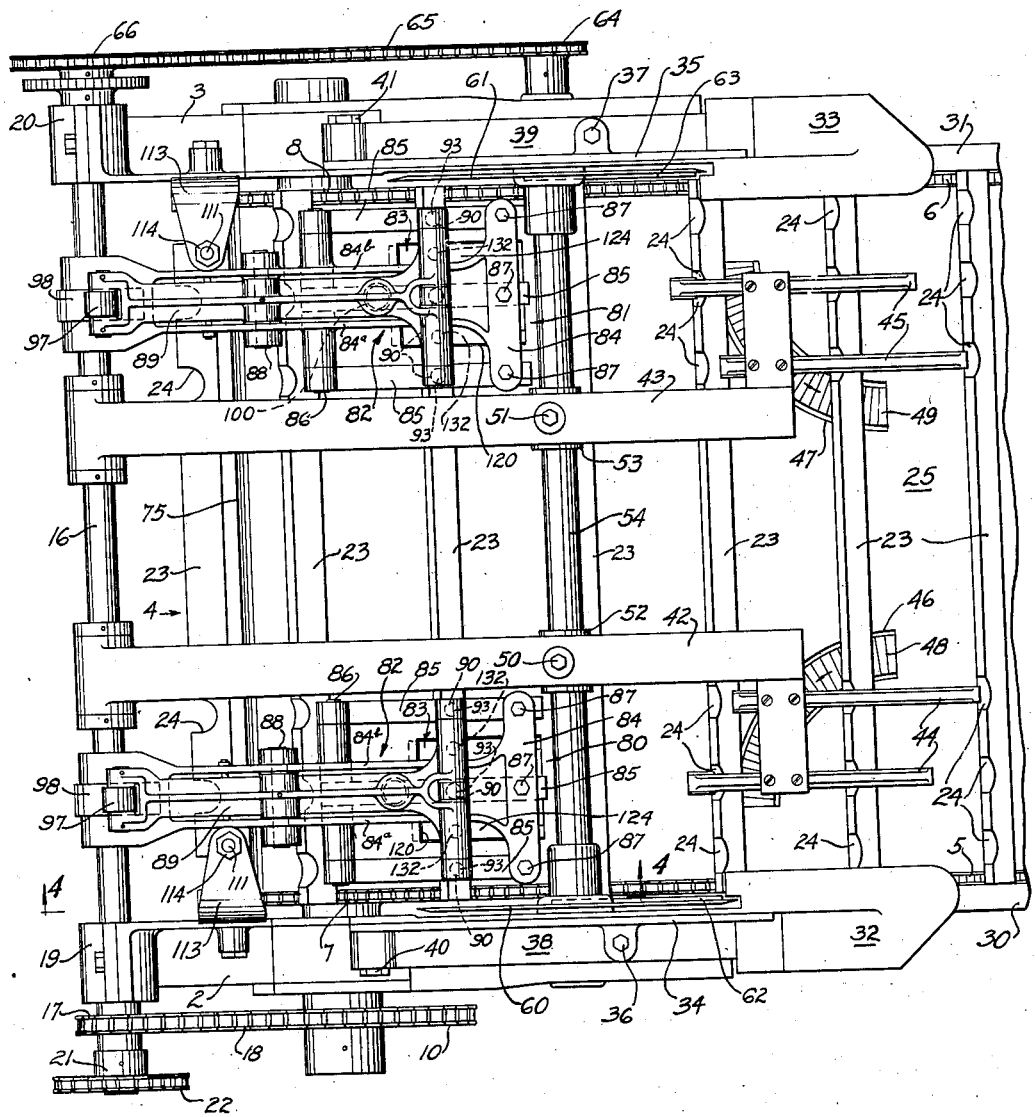
FIG_3_
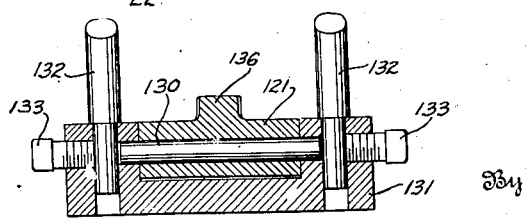
FIG_7_
Inventor
CHARLES E. KERR

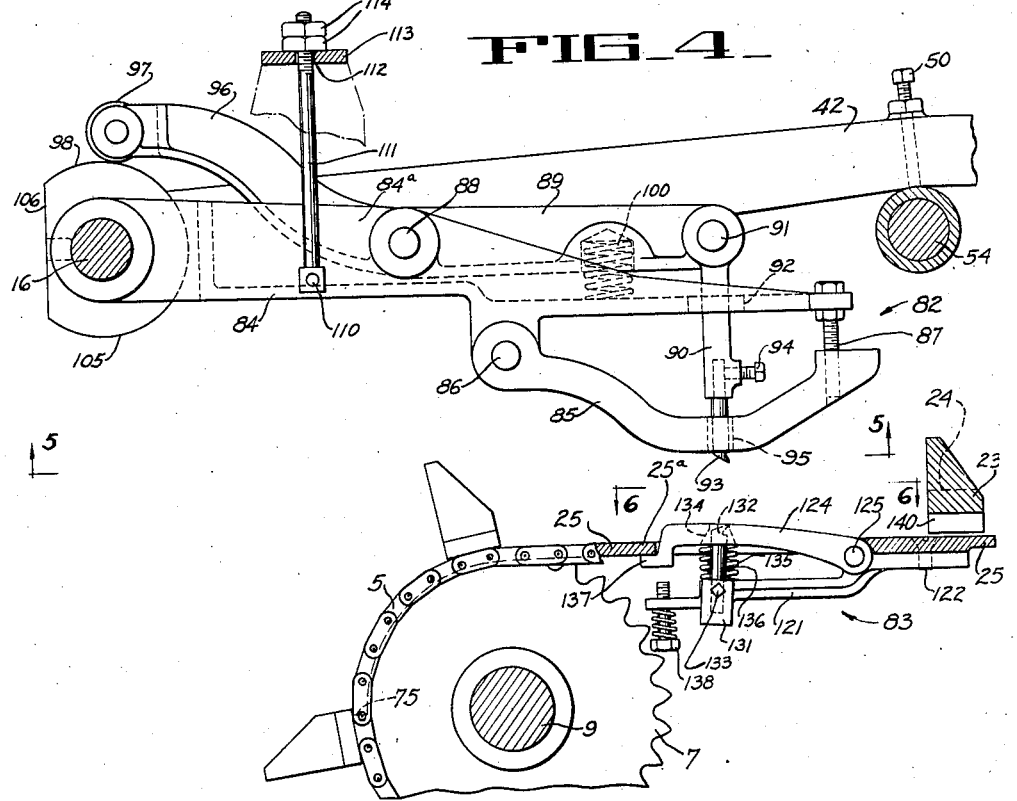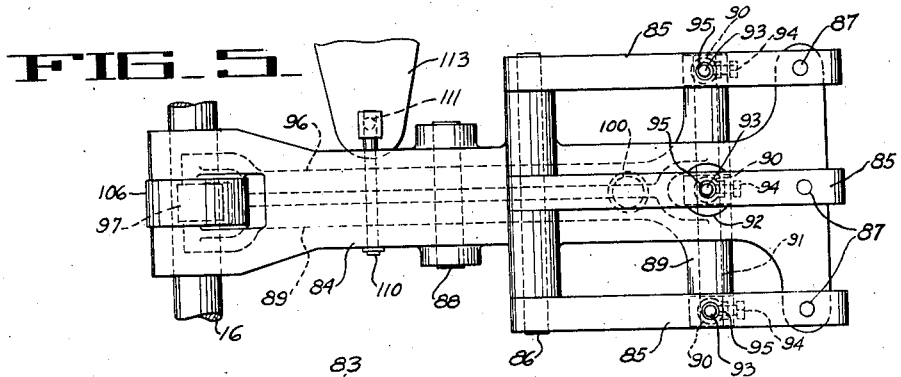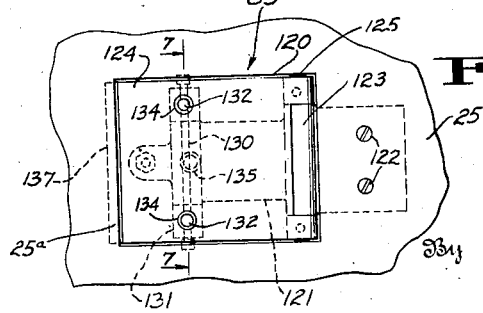

Patented Aug. 3, 1943

2,325,859

UNITED STATES PATENT OFFICE 2,325,859

CORN HUSKER

Charles E. Kerr, Hoopeston, Ill., assignor to Food Machinery Corporation, San Jose, Calif., a corporation of Delaware Application July 22, 1940, Serial No. 346,694

18 Claims. (Cl. 130—5)

The present invention appertains to a machine for husking green corn and relates particularly to an improved husk ripping mechanism for preparing the ears of corn for the husking operation.

An object of the present invention is to provide a corn husker with an improved husk ripping mechanism for ripping or shredding the husks of the ears of corn to provide projecting husk portions for engagement by the husking rolls of the machine.

Another object is to provide a corn husker which comprises an improved husk ripping mechanism for ripping or shredding the husks at uniform depth irrespective of the size of the ears of corn.

Another object is to provide a husk ripping mechanism which is self-cleaning, non-clogging and very efficient in operation.

Other and further objects and advantages of the present invention will become apparent from the following description and drawings, in which:

Fig. 3 is a plan view of the portion of the corn husker shown in Fig. 1.

Fig. 4 is a longitudinal section taken along lines 4—4 of Fig. 3 illustrating primarily the husk ripping mechanism of the machine, certain parts being omitted.

Fig. 5 is a bottom view of the upper ripper mechanism taken along lines 5—5 of Fig. 4.

Fig. 6 is a top view of the lower ripping mechanism of the machine, taken along lines 6—6 in Fig. 4.

Fig. 7 is a transverse section through the lower ripping mechanism taken along lines 7—7 of Fig. 6.

Figure 1:
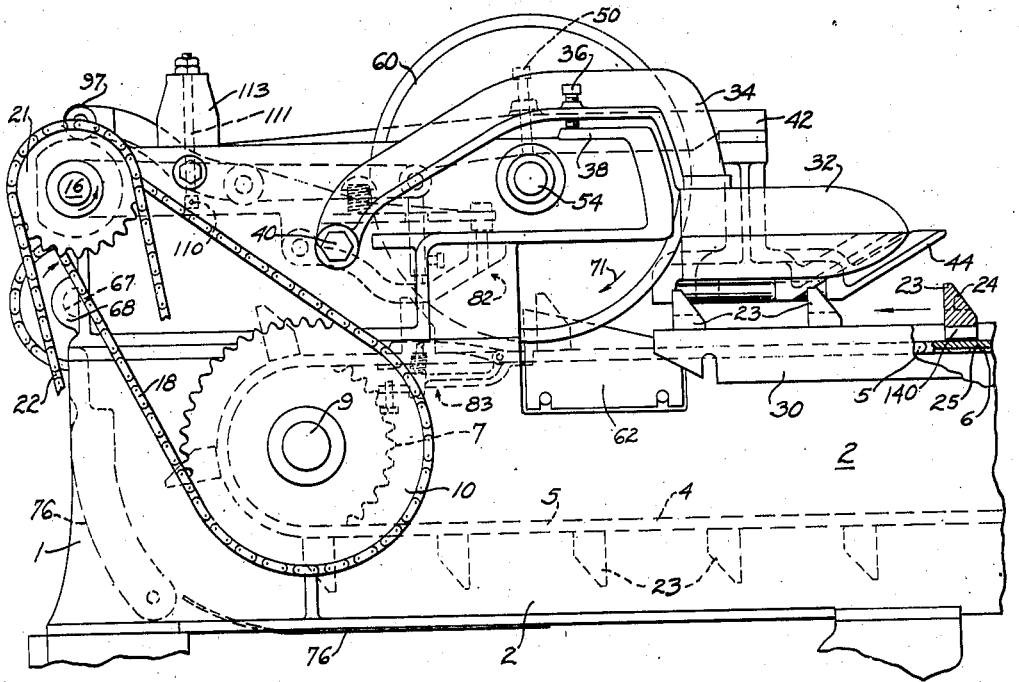
Fig. 1 is a side elevation of a portion of a corn husker embodying the present invention.
Figure 2:
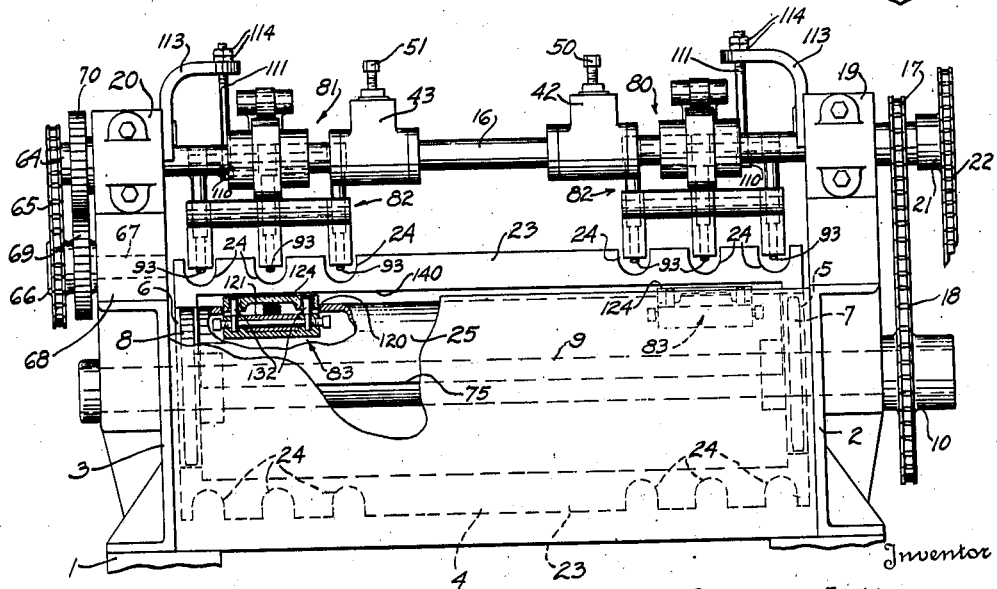
Fig. 2 is a left end view of Fig. 1, certain portions being shown in section.

In the drawings, Figs. 1 to 3 inclusive illustrate a portion of a corn husker embodying the present invention which comprises a frame structure 1 including side portions 2 and 3 between which a conveyor structure 4 is mounted. The conveyor structure 4 consists of two endless chains 5 and 6 positioned adjacent the side portions 2 and 3, respectively, of the frame structure 1 of the machine. These chains 5 and 6 are trained around sprocket wheels 7 and 8 at the rear end of the machine and corresponding sprocket wheels, not shown, at the front end thereof. The sprocket wheels 7 and 8 are keyed upon a shaft 9 rotatably mounted within bearings on the side portions 2 and 3 of the frame 1 and provided with a sprocket wheel 10 fixed to one end thereof. The sprocket wheel 10 is operatively connected with a shaft 16 and a sprocket wheel 17 fixed thereon by means of a chain 18. The shaft 16 is mounted within bearings 19 and 20 secured to the side portions 2 and 3, respectively, of the frame 1 and carries a sprocket wheel 21 fixed thereto (see Figs. 1 and 3). The shaft 16 is driven from a source of power by means of a chain 22 in any convenient manner.

Secured to the endless chains 5 and 6 and extending transversely of the machine are conveyor bars 23 provided with cut-away portions 24. Positioned below the transverse bars 23 and extending transversely across the machine between the upper run of the chains 5 and 6 is a table 25. Mounted adjacent the frame portions 2 and 3 on both sides of the machine are lower gauge members 30 and 31 secured to the side portions of the frame in any convenient manner, and positioned above the same for cooperation therewith are upper gauge shoes 32 and 33 supported by arms 34 and 35, respectively, which are pivotally secured to the side portions 2 and 3 of the frame structure, as clearly shown at 40 and 41. The arms 34 and 35 are provided with set screws 36 and 37 adapted to engage flange portions 38 and 39, respectively, of the frame members 2 and 3 to thereby limit the downward movement of the upper gauge shoes 32 and 33. By manipulating the set screws 36 and 37 the position of the upper gauge members 32 and 33 with respect to the lower gauge members 30 and 31 may be accurately adjusted.

Pivotally mounted upon the shaft 16 are arms 42 and 43 provided with presser members 44 and 45, respectively, positioned above the conveyor mechanism 4 and table 25 at each side of the machine, as best seen from Fig. 3. These presser members 44 and 45 are positioned intermediate the upper gauge shoes 32 and 33 above the table 25 and project into the cut-away portions 24 of the transverse bars 23, so that they do not interfere with the operation of the same.

Arranged below the table 25 of the machine and extending through openings 46 and 47 thereof (see Fig. 3) are ear mover gears 48 and 49, which are driven in a direction as indicated by arrows in Fig. 3, during the operation of the machine by any suitable mechanism, not shown, and function to shift the ears of corn in transverse directions toward the gauge members 30, 32 and 31, 33 respectively.

The construction of these ear mover gears 48, 49 and their associated mechanism is well known in the art and does not form a part of the present invention. For a disclosure of these parts reference is made to Patent No. 2,177,988 issued to C. E. Kerr on October 31, 1939.

The downward movement of the presser members 44 and 45 is limited by means of set screws 50 and 51, which engage sleeves 52 and 53, respectively, fixed upon a shaft 54. The shaft 54 is rotatably arranged within bearings of the frame portions 2 and 3 and extends transversely of the machine. This shaft carries circular debutting knives 60 and 61 positioned in proximity to the side frame members 2 and 3, respectively. These circular debutting knives 60 and 61 cooperate with stationary debutting blades 62 and 63 secured to the side members of the frame 1.

The shaft 54 is provided with a sprocket wheel 64 fixed thereto which is operatively connected by means of a sprocket chain 65 with a sprocket wheel 66, rotatably mounted upon stud shaft 67 (see Fig. 2). The stud shaft 67 is fixed within a socket 68 secured to the side wall 3 of the machine and carries a pinion 69 which is integral with the sprocket wheel 66 and intermeshes with a pinion 70 fixed upon the shaft 16 of the machine, so that upon rotation of the shaft 16 in a direction as indicated by an arrow in Fig. 1 the circular debutting knives 60 and 61 are rotated in the direction of the arrow 71.

The rear end of the table 25 is curved in a downward direction and terminates at 75 (Fig. 3). Positioned opposite the rear end 75 of the table 25 and extending transversely across the machine is a discharge chute 76 leading downwardly and forwardly below the conveyor mechanism 1, as best seen in Fig. 1.

Upon operation of the machine the ears of corn are placed between the transverse bars 23 in two files upon the table 25 adjacent the sides thereof with the axis of the corn parallel to the transverse bars and with their butt ends toward the sides of the machine. Thereupon the ears of corn are advanced by the bars 23 of the conveyor mechanism toward the presser members 44 and 45 and the ear mover gears 48 and 49 which shift the ears in transverse directions toward the gauge members 30, 32 and 31, 33, respectively, which position the butt ends of the corn in proper predetermined relation with respect to the debutting knives 60 and 61. The presser arms 44 and 45 are adapted to hold the ears in proper contact with the ear mover gears 48 and 49 during the transverse movement of the ears above referred to.

During further travel of the ears the butt ends thereof are severed therefrom by the debutting knives and subsequently the ears are discharged from the table 25 and drop into the discharge chute 76 which delivers the same to husking rolls of any suitable construction, not shown, for removal of the husks therefrom. Thereupon, the husked ears of corn are discharged from the machine.

Positioned intermediate the presser members 44, 45 and the discharge chute 76 above the table 25 of the machine are husk ripping mechanisms 80 and 81 (see Figs. 2 and 3) for ripping and shredding the ears to provide projecting husk portions for engagement by the husking rolls of the machine. Both of these husk ripping mechanisms are of the same construction and operate in the same manner so that the description of one will be sufficient for the purposes herein.

Each of these husk ripping mechanisms 80 and 81, as will be clearly seen from Figs. 1, 3 and 4, consists of an upper ripper 82 and a lower ripper 83. The upper ripper structure 82 comprises a main ripper bracket 84 pivotally supported on shaft 16 and provided at its forward end with a plurality of spaced guide members 85 pivotally secured thereto at 86 and held in a predetermined position with respect thereto by means of adjustment screws 87. Pivotally mounted within the main ripper bracket 84 between vertical ribs 84a and 84b thereof by means of a pivot pin 88 is a ripper actuating arm 89 provided with a plurality of ripper holders 90 pivotally secured thereto by means of a pivot shaft 91, as will be best seen from Figs. 4 and 5. The ripper holders 90 are spaced with respect to each other and extend in downward directions with the holder 90 directly above the bracket 84 extending through an opening 92 therein. The ripper holders 90 are provided at their lower ends with ripper elements 93, which extend through openings 95 in the guide members 85 and are adjustably secured thereto by means of set screws 94.

The free end 96 of the ripper actuating arm 89 is provided with a roller 97 rotatably carried thereon which is adapted to engage an actuating cam 98 fixed to shaft 16 in any convenient manner. A coil spring 100 interposed between the ripper actuating arm 89 and the main ripper bracket 84 maintains the roller 97 in engagement with the cam 98 during the rotation of the latter. The cam 98 is provided with a circular cam surface 105 and a straight cam surface 106, so that during rotation of the cam 98 the ripper actuating arm 89 will be oscillated around its pivot pin 88, causing reciprocation of the ripper elements 93 in vertical directions.

When the roller 97 is engaged with the circular cam surface the ripper elements 93 are in their lowermost position in which they project a predetermined distance below the lower surface of the guide members 85, while when the roller 97 is in engagement with the straight cam surface 106 the ripper elements 93 are retracted into the openings 95 of the guide members 85 under the action of the coil spring 100.

Pivotally secured to the main ripper brackets 84 of each ripper mechanism 80 and 81 at 110 are supporting rods 111 extending through openings 112 of supporting brackets 113 secured to the frame portions 2 and 3, respectively. The upper end of the supporting rods 111 are threaded and provided with nuts 114 adapted to engage the supporting brackets 113, so as to maintain the main ripper brackets 84 and thereby the entire upper ripper assemblies 80 and 81 in predetermined positions above the table 25 of the machine. By turning the nuts 114 in one or the other direction the position of the upper ripper assemblies with respect to the table 25 of the machine may be varied.

The table 25 of the machine is provided with openings 120 below the upper ripper mechanisms 82, and secured to the table 25 and positioned within said openings are the lower ripper mechanisms 83 previously referred to. Both of these lower ripper mechanisms are of the same construction and only one will be described herein.

Each of these lower ripper mechanisms consists of a supporting bracket 121 secured to the table at 122 and provided with a bearing portion 123 within which a guard plate 124 is pivotally mounted by means of a pivot pin 125. Pivotally secured to the supporting bracket 121 by means of a pivot pin 130 (see Figs. 6 and 7) is a ripper holder 131 within which ripper elements 132 are adjustably mounted by means of set screws 133. The ripper elements 132 extend in upward directions, and the guard plate 124 is provided with openings 134 through which the ripping elements 132 are adapted to project. Interposed between the supporting bracket 121 and the guard plate 124 and held against removal by means of a lug 136 is a coil spring 135 which normally holds the guard plate 124 in its uppermost position, as shown in Fig. 4. The guard plate 124 is provided with a lug portion 137 which is adapted to engage the portion 25a of the table 25 so as to limit the upward movement of the guard plate, as will be best seen from Fig. 4, while the downward movement of the guard plate 124 is limited by means of a set screw 138 adjustably mounted within the supporting bracket 121.

From the above it will therefore be seen that upon downward movement of the guard plate 124 against the tension of the spring 135 the ripper elements 132 will project through the openings 134 and extend above the upper surface of the guard plate 124.

The pivotal movement of the ripper holder 131 and ripper elements 132 around pivot pin 130 is very limited but necessary to permit a free movement of the guard plate 124 with respect to the ripper elements 132.

The ripper elements 132 are positioned intermediate the ripper elements 93, as best seen from Fig. 2, and all of these ripper elements are in alignment transversely of the machine. The free ends of the ripper elements 93 and 132 are notched as indicated to provide sharp cutting edges pointing downwardly and upwardly, respectively, in directions opposite to the direction of travel of the ears of corn.

While the ears are advanced from the debutting knives toward the discharge chute 16 and travel past the husk ripping mechanisms the guide members 85 of the upper ripper structures are engaged by the same and the ripper elements 93 are elevated into proper relation with respect to the ears. At the same time, the ears travel over the guard plates 124 and due to their weight and the weight of the upper ripper mechanisms resting upon the same the guard plates 124 are depressed against the tension of the coil springs 135 so that the ripper elements 132 will project through the openings 134 above the upper surfaces of the guard plates 124. While the ears of corn now approach the upper and lower ripper elements 93 and 132 the upper ripper elements are moved to their lowermost position, as shown in Fig. 4, in which they project a predetermined distance below the lower surfaces of the guide members 85.

The downward movement of the ripper elements 93 is effected by the operation of the cam 98 which is so positioned upon the shaft 16 that the downward movement of the ripper elements 93 will be effected in timed relation with respect to the operation of the conveyor mechanism 1.

In other words, if an ear of corn passes the upper ripper mechanisms 82 the ripper elements 93 will be in their lowermost position, so that a ripping of the husks of the ears travelling past the upper and lower ripping elements is effected. As soon as the ears have passed the upper ripper mechanism, the straight surface 106 of the cam 105 is opposite the roller 97 so that the ripping elements 93 are retracted by the action of the coil spring 100 into the openings 95 of the guide members 85, and any adhering husk portions are thereby removed from the ripping elements 93.

In like manner, as soon as the ear of corn has passed the lower ripper structure 83 the pressure of the spring 135 moves the guard plate 124 to its uppermost position, as shown in Fig. 4, in which the plate extends above the upper ends of the ripper elements 132 so that any adhering husk portions are removed from the same.

In this manner a very effective ripping of the husks of the ears of corn is effected, and any clogging of the ripping elements in view of the self-cleaning action of the rippers is prevented.

From the above it will therefore be seen that due to the pivotal movement of the upper ripper structure 82 a correct positioning of the upper ripper mechanism with respect to each ear of corn is effected irrespective of the size thereof. In practice each upper ripper mechanism is so adjusted by manipulation of the nuts 114 of the supporting rod 111 that the guard members 85 will properly engage the smallest ear of corn handled by the machine.

The depth of cut of the ripper elements 93 may be properly gauged by adjusting the position of the guide members 85 with respect to the upper ripper elements 93 upon manipulation of the adjustment screws 87, while the depth of cut of the ripper elements 132 is regulated upon rotation of set screw 138, by which the extent of downward movement of the guard plate 124 and the projection of the ripper elements above the upper surface of the guard plate is adjusted. Therefore, in view of the above and the floating arrangement of the upper ripper structure, gouging of the kernels of the ears of corn is effectively eliminated irrespective of the size of corn handled by the machine.

Consequently, while the ears of corn travel past the ripping mechanism of the machine the ripping elements of the upper and lower rippers project a uniform distance into the path of the ears irrespective of their size and efficiently rip the husks thereof without damaging the kernels of the corn. This is important where whole grain corn is being packed because in such cases it is essential not to gouge the kernels of the corn.

The upper ripper elements 93 and guide members 85 are positioned in alignment with the cutaway portions 24 of the conveyor bars 23 so that they do not contact the same when the ripper mechanisms are set close to the table 25. The conveyor bars 23 are also cut away at the lower sides adjacent the table 25, as indicated at 140, so that they may move past the lower ripper mechanisms 83 without interfering with the operation of the guard plates 124 and lower ripper elements 132.

It should further be noted that in view of the alignment of the upper and lower ripper elements transversely of the machine the husks of each ear of corn are simultaneously engaged by the upper and lower ripping elements so that a turning of the ears during the ripping operation is prevented.

While I have shown and described a preferred embodiment of my invention, such invention is capable of modification and variation without departing from the spirit and scope thereof, as defined in the claims appended hereto.

Having thus described my invention, what I claim and desire to protect by Letters Patent is:

1. In a corn husker, husk ripping means, a conveyor for moving the ears of corn past the husk ripping means, a movable bracket, means for movably supporting the husk ripping means on said bracket, guide means associated with the bracket and engageable with each ear of corn travelling past the same for gauging the depth of cut of the husk ripping means with respect to each ear, means for reciprocating the husk ripping means relative to the bracket and guide means for moving the husk ripping means into and out of ripping position for engagement with the husks of the ears and for cleaning the ripping means of husk portions adhering to the same.

2. In a corn husker, pivotally mounted gauge means for engaging the ears of corn, husk ripping means pivotally mounted on said gauge means, means for advancing the ears past the gauge and husk ripping means, and means for moving the husk ripping means relative to the gauge means into and out of ripping position for engagement with the husks of the ears.

3. In a corn husker, pivotally mounted gauge means for engaging the ears of corn, husk ripping means pivotally mounted on the gauge means, a conveyor for advancing the ears past the gauge and husk ripping means, and means for moving the husk ripping means relative to the gauge means into and out of ripping position for engagement with the husks of the ears in timed relation with respect to the conveyor.

4. In a corn husker, pivotally mounted gauge means for engaging the ears of corn, husk ripping means pivotally mounted on said gauge means, means for advancing the ears past the gauge and husk ripping means, whereby upon engagement of the ears with the gauge means the husk ripping means are held in predetermined relation with respect to the ears, and means for moving the husk ripping means a predetermined distance relative to the gauge means into and out of ripping engagement with the husks of the ears irrespective of the position of the gauge means.

5. In a corn husker pivotally mounted gauge means for engaging the ears of corn, husk ripping means pivotally mounted on said gauge means, means for advancing the ears past the gauge and husk ripping means, means for moving the husk ripping means relative to the gauge means into and out of ripping position for engagement with the husks of the ears, and means for adjusting the position of the gauge means relative to the husk ripping means to vary the depth of cut of the husk ripping means.

6. In a corn husker, movable gauge means for engaging ears of corn and movable in response to variations in size of said ears, husk ripping means independently movable relative to said gauge means and unaffected by movement of said gauge means, means for advancing ears of corn past said gauge means and husk ripping means for engagement thereby, and means for moving said husk ripping means into and out of ripping position for engagement with the husks of said ears of corn.

7. In a corn husker, movable husk ripping means, gauge means for gauging the cutting depth of said ripping means, and movable in response to differences in size of ears of corn engaged thereby, means for advancing ears of corn past said gauge means and ripping means for engagement thereby, and means for moving said ripping means relative to said gauge means into and out of ripping position for engagement with the husks of said ears of corn, said ripper moving means including means for maintaining the same limits of ripping engagement of said ripping means for all positions of said gauge means.

8. In a corn husker, means for moving ears of corn along a predetermined path for engagement by husk ripping means, a depressible gauge normally projecting into said path, a husk ripper operably associated with said depressible gauge and positioned for ripping engagement with ears of corn moved along said path, a movable gauge opposite said depressible gauge and adapted to accommodate different sizes of ears of corn, a husk ripper independently movable relative to said movable gauge and means for moving said independently movable ripper into a predetermined ripping position relative to said movable gauge for engagement with ears of corn moved along said path and which position is unaffected by movement of said movable gauge means.

9. In a corn husker, means for moving ears of corn to be husked along a predetermined path, depressible gauge means normally projecting into said path for engagement with ears of corn in said path, ripper means associated with said depressible gauge means and positioned for ripping engagement with ears of corn intercepted thereby, gravity acting gauge means to engage said ears concurrently with said depressible gauge means and adapted to accommodate ears of different size, ripping means movably mounted upon said gravity gauge means and movable with said gravity gauge means without altering its position relative thereto, and means for moving said movable ripping means into and out of ripping position for engaging ears of corn intercepted by said gravity gauge means.

10. In a corn husker, pivotally mounted gauge means for engaging ears of corn, husk ripping means movably mounted on said gauge means, means for advancing the ears past said gauge means and husk ripping means for engagement thereby, and means coaxial with the pivot of said gauge means for moving said ripping means relative to said gauge means into and out of ripping position for engagement with the husks of said ears.

11. In a corn husker, a table forming a path for the ears of corn, husk ripping means adjacent the table and extending into said path for ripping engagement with the ears, a rigid gauge plate movably mounted on said table and closely positioned with respect to the husk ripping means, means normally projecting the plate into said path beyond the ripping means to sheath the same, and means for conveying the ears over said table along said path to engage and depress said plate and to expose the husk ripping means for ripping engagement with the ears.

12. In a corn husker, a table forming a path for the ears of corn, husk ripping means adjacent the table and extending into said path for ripping engagement with the ears, a rigid gauge plate movably mounted on said table and closely positioned with respect to the husk ripping means, means normally projecting the plate into said path beyond the ripping means to sheath the same, means for conveying the ears over said table along said path to engage and depress said plate and to expose the husk ripping means for ripping engagement with the ears, and means for limiting the movement of the plate to gauge the depth of cut of the ripping means.

13. In a corn husker, a table forming a path for the ears of corn and including a movably mounted section having an opening, husk ripping means mounted below said table and extending through the opening of said section into said path, means normally projecting the section into said path beyond the ripping means to sheath the same, and means for conveying the ears over the table along said path to engage and depress said section and to expose the husk ripping means for ripping engagement with the ears of corn.

14. In a corn husker, a table forming a path for the ears of corn and including a movably mounted section having an opening, husk ripping means mounted below said table and extending through the opening of said section into said path, means normally projecting the section into said path beyond the ripping means to sheath the same, means for conveying the ears over the table along said path to engage and depress said section and to expose the husk ripping means for ripping engagement with the ears of corn, and means for adjusting the movement of said section to gauge the depth of cut of the ripping means.

15. In a corn husker, means forming a path, means for moving the ears of corn along said path, adjustable gauge means movably projecting into said path for engaging the ears traveling therealong, husk ripping means movable on said gauge means, and means for moving the husk ripping means relative to the gauge means into and out of ripping position for engagement with the husk of the ears.

16. In a corn husker, reciprocable husk ripping means, a conveyer for moving the ears of corn past said ripping means, means for moving the husk ripping means into and out of ripping position for engagement with the husks of the ears during the travel of the ears past the ripping means, means for gauging the depth of cut of the husk ripping means, and means for adjusting said gauging means with respect to the husk ripping means for varying the depth of cut thereof.

17. In a corn husker, husk ripping means, a conveyor for moving the ears of corn past the husk ripping means, means for movably supporting the husk ripping means, means for reciprocating the husk ripping means for moving the same into and out of ripping position for engagement with the husks of said ears, gauge means movably mounted on said supporting means and engageable with the ears for gauging the depth of cut of the husk ripping means, and means for adjusting the gauge means relative to the supporting means for varying the depth of cut of the husk ripping means.

18. In a corn husker, means forming a path, means for moving the ears of corn along said path, oppositely disposed gauge means movably projecting into said path for engaging the ears traveling therealong, husk ripping means associated with each of said gauge means, one of said ripping means being mounted upon and independently movable relative to its gauge means, and means for moving said independently movable ripping means into and out of ripping position.

CHARLES E. KERR.

CERTIFICATE OF CORRECTION.

Patent No. 2,325,859.　　　　　　　　　　　　　　　　August 3, 1943.

CHARLES E. KERR.

It is hereby certified that error appears in the printed specification of the above numbered patent requiring correction as follows: Page 4, first column, line 41, claim 4, after "ripping" insert --position for--; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.